United States Patent
Akiyama et al.

(10) Patent No.: US 6,478,451 B2
(45) Date of Patent: Nov. 12, 2002

(54) VEHICULAR LAMP UNIT AND METHOD FOR MANUFACTURING SAME

(75) Inventors: Kazuo Akiyama, Shizuoka (JP); Fujihiko Sugiyama, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/794,243

(22) Filed: Feb. 28, 2001

(65) Prior Publication Data

US 2001/0028568 A1 Oct. 11, 2001

(30) Foreign Application Priority Data

Feb. 29, 2000 (JP) ........................................ 2000-052901

(51) Int. Cl.$^7$ .............................................. F21V 31/00
(52) U.S. Cl. ...................... 362/267; 362/310; 362/311; 362/520
(58) Field of Search ................................ 362/546, 267, 362/310, 311, 520

(56) References Cited

U.S. PATENT DOCUMENTS

| | | | |
|---|---|---|---|
| 4,831,502 A | | 5/1989 | Fujino et al. |
| 5,331,521 A | * | 7/1994 | Ravier et al. ................. 362/80 |
| 5,398,172 A | * | 3/1995 | Kojima et al. ................. 362/61 |
| 5,560,706 A | * | 10/1996 | Yamazaki et al. ........... 362/267 |
| 5,605,392 A | * | 2/1997 | Daumueller et al. ....... 362/83.3 |
| 5,618,098 A | | 4/1997 | Naganawa et al. |
| 5,673,992 A | * | 10/1997 | Schmitt ........................ 362/66 |
| 5,735,591 A | | 4/1998 | Ruckwied |
| 5,947,591 A | | 9/1999 | Katsumata et al. |
| 6,017,141 A | | 1/2000 | Sugiyama et al. |
| 6,033,095 A | | 3/2000 | Ognian |
| 6,033,505 A | | 3/2000 | Sugiyama et al. |
| 6,089,731 A | | 7/2000 | Sugiyama et al. |
| 6,217,202 B1 | | 4/2001 | Kageyama et al. |
| 6,318,883 B1 | * | 11/2001 | Sugiyama et al. .......... 362/267 |

* cited by examiner

*Primary Examiner*—Alan Cariaso
*Assistant Examiner*—Sharon Payne
(74) *Attorney, Agent, or Firm*—Sughrue Mion, PLLC (57) ABSTRACT

A vehicular lamp in which bonding failure between a front lens and a lamp body is prevented while enhancing the bonding strength and improving the quality of the outer appearance around the bonded surface therebetween. An edge surface of a seal leg of the front lens and a receiving surface of a lamp body are bonded together by laser beam welding so as to improve the quality of the outer appearance of the portion around the bonded surfaces. The bonded surface is inclined at a predetermined angle with respect to a plane perpendicular to the bonding direction. Even if the edge surface of the seal leg or the receiving surface has a wave-like irregularity such that gaps are created in areas therebetween, the pressure in the bonding direction acting on the members to be bonded causes slippage between them, resulting in sealing the gaps. The beam spot diameter of a laser beam irradiated onto the receiving surface is increased in an amount corresponding to the angle of inclination of the bonded surface, thus increasing the bonding width and enhancing the bonding strength.

15 Claims, 7 Drawing Sheets

VEHICULAR LAMP UNIT AND METHOD FOR MANUFACTURING SAME

BACKGROUND OF THE INVENTION

The present invention relates to a vehicular lamp unit, and a manufacturing method therefor, in which a front lens and a lamp body are directly bonded together.

Conventionally, two types of methods for bonding a front lens and a lamp body of a vehicular lamp unit have been well known, that is, indirect bonding via a seal member (for example, the hot melt sealing method), and direct bonding by bringing the two members into direct abutment (for example, heating plate welding, vibration welding, ultrasonic bonding, or the like).

As a direct bonding method, laser beam welding has been well known in other technical fields. This method is applicable to the bonding of a front lens and a lamp body using the process as described below (see also commonly assigned U.S. patent application Ser. No. 09/548,361).

Figure 7:
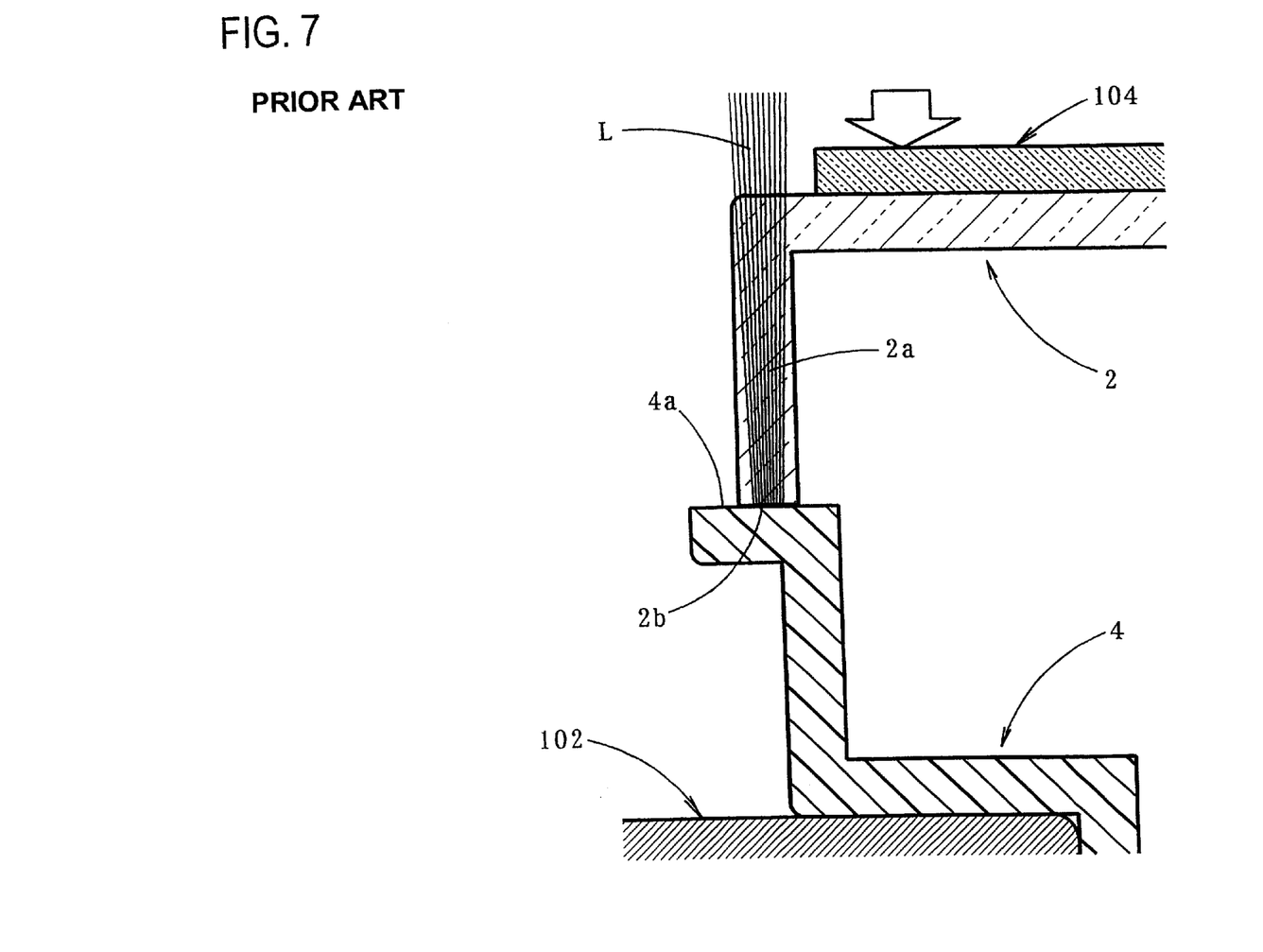
FIG. 7 is a view similar to FIG. 2 showing a previously known bonding method when laser beam welding is employed for bonding a front lens and lamp body.

Referring to FIG. 7, a seal leg 2a extending in the outward direction along the outer periphery of a front lens 2 is formed. A receiving surface 4a is formed along the opening portion of the front end of a lamp body 4. The lamp body 4 is placed on a receiving jig 102. The front lens 2 is set onto the lamp body 4 in such a manner that an end surface 2b of the seal leg 2a is brought into abutment against the receiving surface 4a. The front lens 2 is further covered with a transparent pressure plate 104 through which the front lens 2 is pressed to the lamp body 4. In the above state, a laser beam L is irradiated onto the receiving surface 4a from a position upward of the front lens 2 through the transparent pressure plate 104 and the seal leg 2a. As a result, the receiving surface 4a is heated and melted by the irradiation energy of the laser beam L so as to fuse with the end surface 2b of the seal leg 2a that has been melted by the heat. The front lens 2 and the lamp body 4 thus are bonded together by scanning the laser beam L along the seal leg 2a over the entire length of the front lens 2.

Employing the above-described laser beam welding method allows bonding of the front lens 2 and the lamp body 4 without generating burrs on the respective bonded surfaces, resulting in an improved quality of the outer appearance of the area around the peripheral portion of the bonded surfaces. However, the use of this welding method may result in the following disadvantages.

That is, for reliably bonding the front lens 2 and the lamp body 4 together through laser beam welding it is essential to bring the edge surface 2b of the seal leg 2a into abutment against the receiving surface 4a of the lamp body 4 over the entire length of the bonded surface by pressing the front lens 2 towards the lamp body. If, however, the edge surface 2b of the seal leg 2a or the receiving surface 4a has a wave-like irregularity owing to insufficient smoothness, gaps are created in the areas therebetween, even while pressure is being applied, resulting in bonding failure.

The bonding width of the bonded surface between the front lens 2 and the lamp body 4 is determined by the beam spot diameter of the laser beam L irradiated onto the receiving surface 4a of the lamp body 4. It is desirable that the beam spot diameter be set to a relatively large value such that the bonding strength can be enhanced. Since the laser beam L is irradiated onto the receiving surface 4a through the seal leg 2a, the dimension of the beam spot diameter is limited by the width of the seal leg 2a.

SUMMARY OF THE INVENTION

The invention has been made in view of the foregoing circumstances. It is therefore an object of the invention to provide a vehicular lamp unit, and a manufacturing method therefor, in which the front lens and the lamp body are directly bonded together so as to improve the quality of the appearance of the area around the peripheral portion of the bonded surface, prevent bonding failure between the front lens and the lamp body, and enhance the bonding strength therebetween.

The aforementioned object is realized by the invention by employing laser beam welding as the method for bonding the front lens and the lamp body together and by suitably establishing the configuration of the peripheral portion of the bonded surfaces.

A vehicular lamp unit of the invention having a front lens and a lamp body directly bonded together is characterized in that a seal leg is formed on the outer periphery of the front lens and a receiving surface that is brought into abutment against an end surface of the seal leg is formed on the lamp body, the end surface of the seal leg and the receiving surface are directly bonded together through laser beam welding, and the bonded surface is inclined at a predetermined angle with respect to a plane perpendicular to the reference angle of the lamp unit.

The term "laser beam welding" indicates a bonding method wherein a laser beam transmitting member that allows permeation of the laser beam is brought into abutment against a laser beam non-transmitting member that does not allow permeation of the laser beam, both members are pressed together generally in the direction of the reference axis, and a laser beam is irradiated onto the abutment surfaces of the two members through the laser beam transmission member so as to heat the laser beam non-transmission member. As a result, both members are fused together. The laser beam used for the laser beam welding is not particularly limited, and, for example, a semiconductor laser, a YAG laser or the like may be employed.

The material for forming the lamp body is not particularly limited so long as it does not allow transmission of the laser beam and is heated and melted by the laser beam irradiation. For efficient laser beam welding, it is preferable that the lamp body is formed of a black-colored material to which an auxiliary material such as carbon black has been added so as to enhance the laser beam absorbing capability of the lamp body.

Also, the material for the front lens is not particularly limited so long as it allows transmission of visible light and the laser beam and it can be fused and fixed to a lamp body that has been melted.

The numeric value of the angle of inclination of the bonded surface is not limited so long as such surface is inclined with respect to a plane perpendicular to the reference axis of the lamp unit. The direction of inclination of the bonded surface may be either inward or outward of the front lens. The bonded surface further be formed in a V- or W-like shape.

The vehicular lamp unit according to the present invention has a structure in which the front lens and the lamp body are directly bonded together. The direct bonding is accomplished through a laser beam welding process, and the bonded surfaces are the edge surface of the seal leg formed along the outer periphery of the front lens and the receiving surface formed on the lamp body. This allows bonding without generating burrs on the respective bonded surfaces, thus improving the quality of the outer appearance around the bonded surface.

In addition, the vehicular lamp unit according to the present invention provides the following operational effects owing to inclination of the bonded surface at a predetermined angle with respect to a plane perpendicular to the reference axis.

That is, in the case where gaps are created between the edge surface of the seal leg of the seal leg or the receiving surface having wave-like irregularity owing to insufficient smoothness, the pressure acting on the members to be bonded causes slippage between the members because the bonded surface is inclined. The slippage serves to seal the gaps created in the areas between both members so as to enable abutment thereof over the entire length of the bonded surface. Accordingly, bonding failure is prevented.

The bonding width of the bonded surfaces between the front lens and the lamp body is determined by the beam spot diameter of the laser beam irradiated onto the receiving surface of the lamp body. Since the bonded surfaces are inclined at a predetermined angle with respect to a plane perpendicular to the reference axis of the lamp unit, the beam spot diameter is increased by an amount corresponding to the angle of inclination. As a result, the bonding width of the bonded surface is increased, contributing to an enhancement of the bonding strength by an amount corresponding to the increased width.

The vehicular lamp unit according to the invention having the front lens and the lamp body directly bonded together prevents bonding failure therebetween and enhances the bonding strength while improving the quality of the outer appearance of the portion around the bonded surfaces.

Assuming that, in the aforementioned structure, the receiving surface of the lamp body is further provided with ribs that protrude generally in the direction of the reference axis of the lamp along a side surface on an edge acute-angled portion side of the seal leg of the front lens, the abutment between the ribs and the seal leg prevents the generation of unnecessarily excessive slippage between the edge surface and the receiving surface caused by the pressure applied between the front lens and the lamp body. In addition, part of the laser beam irradiated onto the receiving surface of the lamp body is reflected internally off the edge surface of the seal leg. This internally reflected light is directed to strike a side surface of the ribs so as to heat and melt the ribs, which allows the side surface of the ribs and the side surface on the edge acute-angled portion side of the seal leg to constitute a second bonded surface. This further enhances the bonding strength between the front lens and the lamp body.

Assuming that, in the aforementioned structure, that the angle of inclination with respect to the plane perpendicular to the reference axis of the lamp unit of the bonded surface is in the range from 40 to 50°, the applied pressure is effective not only to easily generate slippage between the edge surface of the seal leg and the receiving surface but also to enlarge the bonding width of the bonded surfaces. Moreover, the ribs formed on the lamp body allow the laser beam that has reflected internally off the edge surface of the seal leg to strike the side surface of the ribs efficiently in a substantially vertical direction. This enhances the bonding strength between the side surface of the ribs and the side surface on the side of the edge acute-angled portion of the seal leg.

DESCRIPTION OF THE PREFERRED EMBODIMENTS

Preferred embodiments of the present invention will be described referring to the accompanying drawings.

Figure 1:
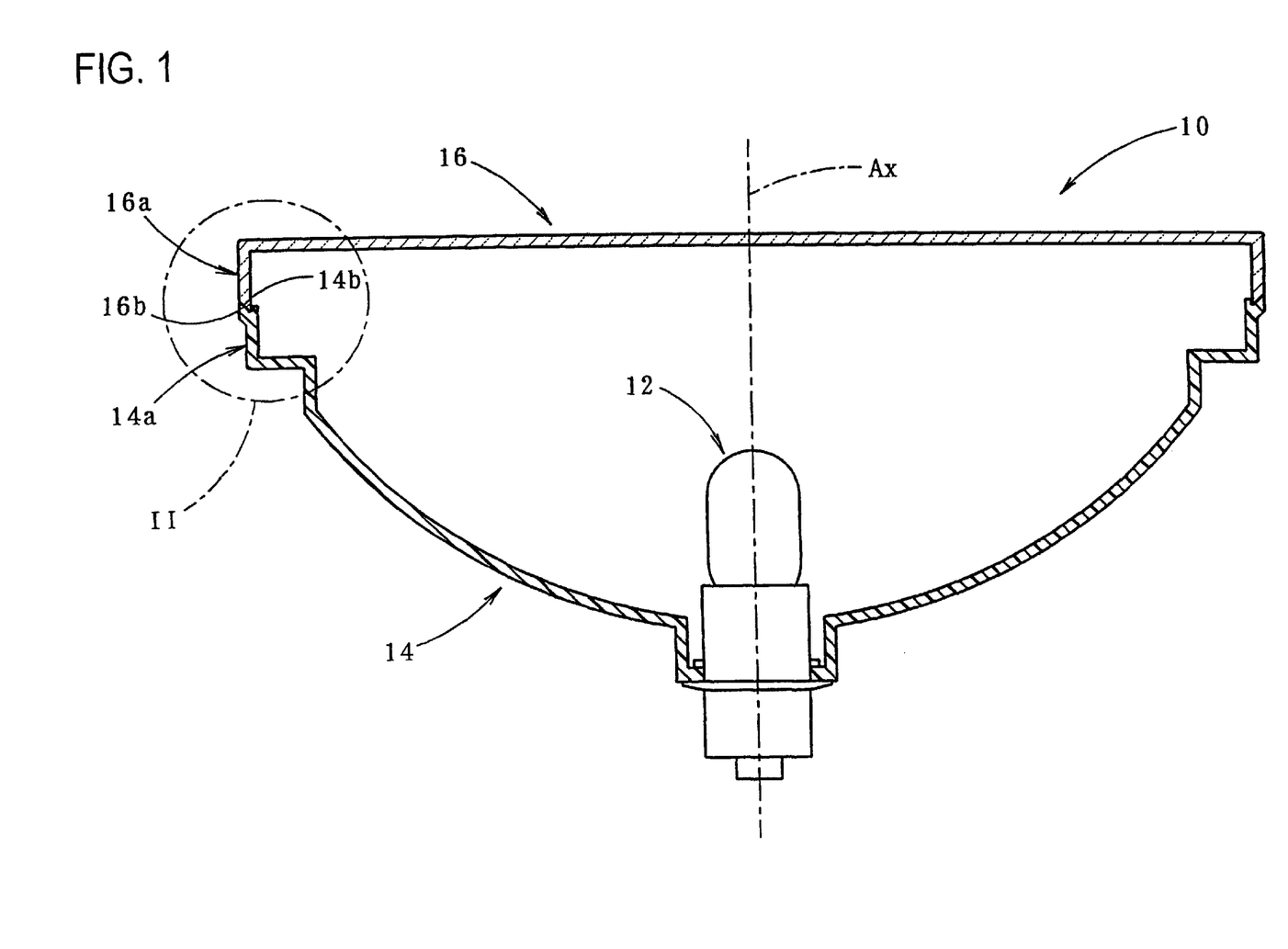
FIG. 1 is a sectional side elevation view of a vehicular lamp unit according to a preferred embodiment of the present invention, which is placed on its top facing upward.
Figure 2:
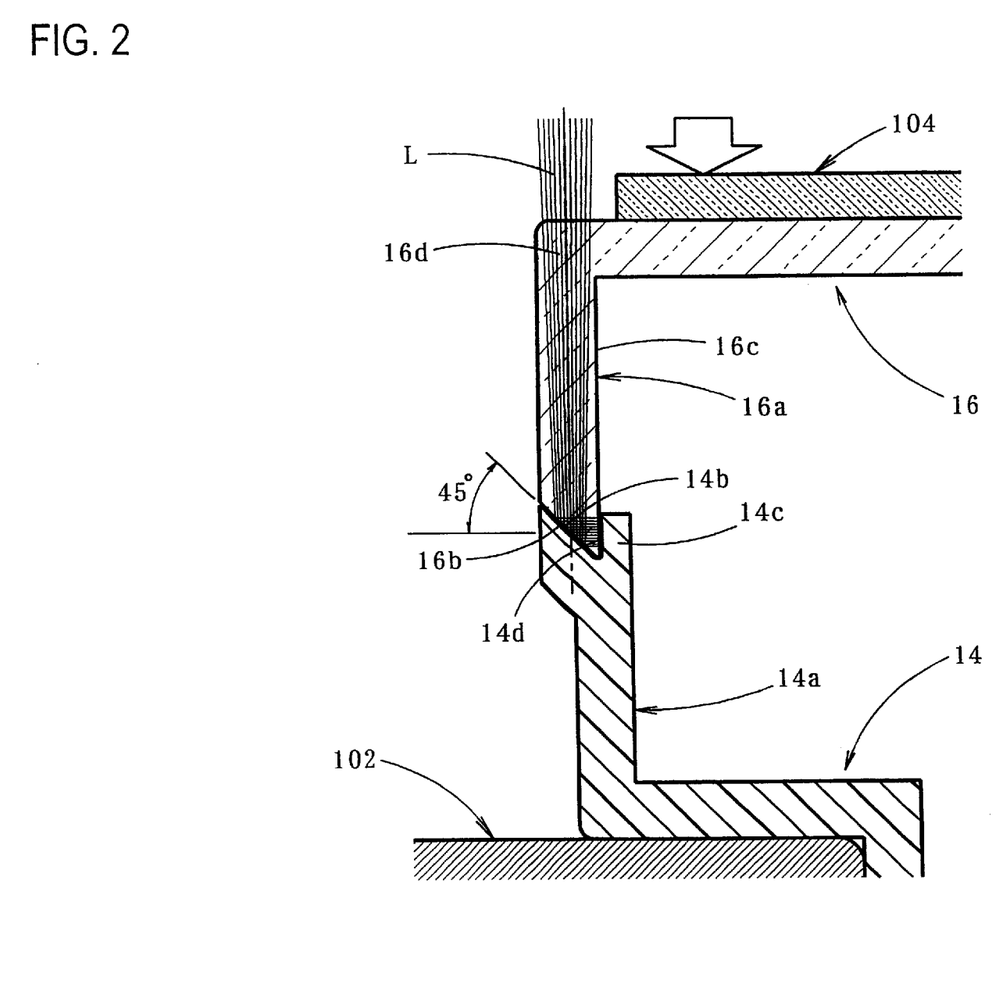
FIG. 2 shows in detail a portion II in FIG. 1.

FIG. 1 is a sectional side elevation view showing a vehicular lamp unit of the preferred embodiment according to the invention which is placed with its top directed upward. FIG. 2 is a view showing in detail a portion II in FIG. 1.

The vehicular lamp unit 10 of the preferred embodiment takes the form of an indicator lamp such as a tail lamp. The lamp is provided with a lamp body 14, on the lamp reference axis Ax of which is mounted a light source bulb 12 extending vertically (in the longitudinal direction with respect to the lamp unit), and a front lens 16 directly bonded to the lamp body 14.

The front lens 16 is formed of a transparent thermoplastic resin material such as polymethyl-methacrylate (PMMA) or poly-carbonate (PC). The outer periphery of the front lens 16 is provided with a seal leg 16a that protrudes downward over the entire length. The seal leg 16a is formed so as to extend in the direction of the reference axis (i.e., vertical direction in the drawing). Its edge surface (the lower end surface) 16b is inclined at 45° inward with respect to the plane (horizontal plane) perpendicular to the reference axis.

The lamp body 14 is formed of an opaque thermoplastic resin material such as acrylonitrile-styrene-acrylate (ASA) or acrylonitrile-butadiene-styrene (ABS). It is provided with an edge flange portion 14a that extends vertically at its front 15 end opening. Similar to the edge surface 16b of the seal leg 16a, an end surface (upper end surface) 14b of the edge flange portion 14a is formed as a plane inclined at 45° on the same side as that of the edge surface 16b of the seal leg 16a with respect to the vertical axis. The end surface 14b constitutes the receiving surface against which the edge surface 16b of the seal leg 16a is abutted. The receiving surface 14b is provided with an inner rib 14c that projects vertically along the inner side surface 16c of the seal leg 16a.

The front lens 16 is bonded to the lamp body 14 by laser beam welding the edge surface 16b of the seal leg 16a to the receiving surface 14b.

Figure 3:
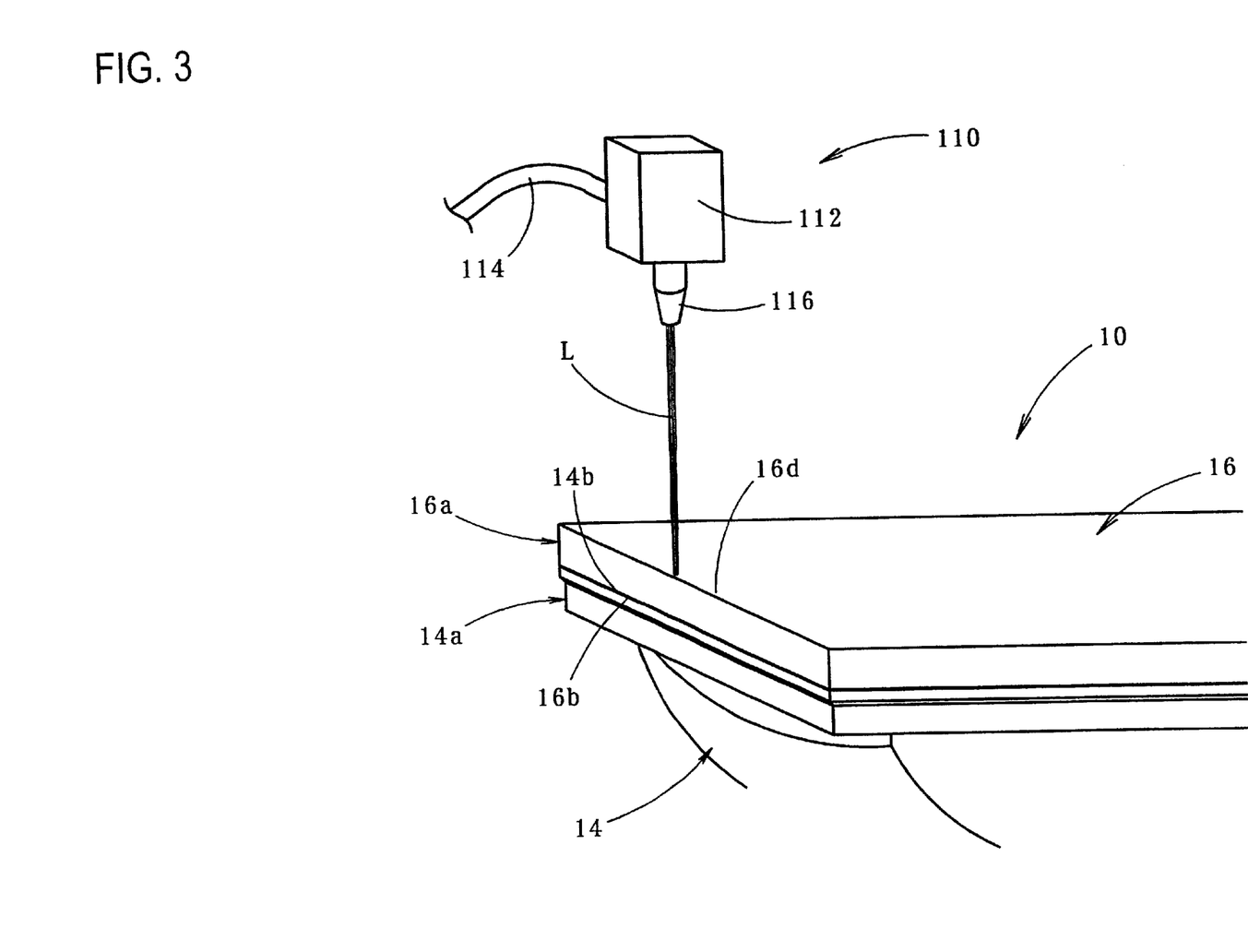
FIG. 3 is a perspective view showing the vehicular lamp unit and a welding robot used for performing laser beam welding in the preferred embodiment.

FIG. 3 is a perspective view showing the vehicular lamp unit 10 and a welding robot 110 used for laser beam welding.

Referring to the drawing, laser beam welding is performed by the welding robot 110 with the vehicular lamp unit 10 placed with its top directed upward.

The welding robot 110 is formed of a robot body (not shown) to which a laser head 112 is attached. This laser head 112 is provided with a fiber cable 114 containing an optical fiber and an emission nozzle 116 with a built-in capacitor lens. The laser beam generated by a laser oscillator (not shown) is emitted from the emission nozzle 116 as a convergent light beam through the fiber cable 114. The laser beam emitted from the emission nozzle 116 serves to form a beam spot of about a diameter of about 1.5 mm at a focal distance of about 60 mm. The laser oscillator is formed of a semiconductor laser with an output of 15 to 100 W and a wavelength of 0.8 to 1.5 μm.

The laser beam welding is performed in the following way.

As shown in FIG. 2, the lamp body 14 is placed on a receiving jig 102, and the front lens 16 is set onto the lamp body 14 such that the edge surface 16b of the seal leg 16a is brought into abutment with the receiving surface 14b. The front lens 16 is further covered with a pressure plate 104 so as to press the front lens 2 downward to the lamp body 4 via the pressure plate 104.

The laser head 112 is positioned upward of the seal leg 16a of the front lens 16 so as to direct the laser beam L from the emission nozzle 116 in the downward direction. The laser beam L is irradiated onto the base end portion 16d of the seal leg 16a so as to permeate through the seal leg 16a and irradiate to the receiving surface 14b of the lamp body 14. The receiving surface 14b is heated and melted by the irradiation energy of the laser beam L. The resultant heat also melts the edge surface 16b of the seal leg 16a. The laser beam L is scanned over the entire length of the front lens 16 along the seal leg 16a so as to bond together the front lens 16 and the lamp body 14.

As has been described in detail, in the vehicular lamp unit 10 of the preferred embodiment, the front lens 16 and the lamp body 14 are directly bonded together by laser beam welding applied between bonded surfaces, that is, the edge surface 16b of the seal leg 16a of the front lens 16 and the receiving surface 14b of the lamp body 14. This makes it possible to perform bonding, generating substantially no burrs on either of the two bonded surfaces. The quality of the outer appearance of the portion around the bonded surfaces is thus improved.

In addition, the vehicular lamp unit 10 according to the present embodiment provides the following operational effects due to the fact that the bonded surface between the front lens 16 and the lamp body 14 is inclined at a predetermined angle with respect to a horizontal plane (a plane perpendicular to the reference axis of the lamp unit).

Even in the case where the edge surface 16b of the seal leg 16a or the receiving surface 14b has a wave-like irregularity as a result of insufficient smoothness such that gaps are created in areas therebetween, the pressure acting on the members to be bonded causes slippage between them because the bonded surface is inclined. This slippage serves to seal the gaps created in the areas between the two members so as to enable abutment thereof along the entire length of the bonded surface. Accordingly, bonding failure is prevented.

The bonding width of the bonded surface between the front lens 16 and the lamp body 14 is determined by the beam spot diameter of the laser beam L irradiated onto the receiving surface 14b of the lamp body 14. Since the bonded surface is inclined at a predetermined angle with respect to the horizontal plane, the beam spot diameter is increased by an amount corresponding to the angle of inclination. This increases the bonding width of the bonded surface, enhancing the bonding strength by an amount corresponding to the increased width.

In the vehicular lamp unit of the preferred embodiment wherein the front lens and the lamp body are directly bonded together, bonding failure between the front lens and lamp body is prevented and the bonding strength enhanced, while improving the quality of the outer appearance of the peripheral portion around the bonded surface.

In the above-described embodiment, since inner ribs 14c, which protrude in the direction of the reference axis along an inner side surface 16c (a side surface on an edge acute-angled portion side) of the seal leg 16a of the front lens 16, are formed on the receiving surface 14b of the lamp body 14, the abutment of the inner ribs 14c against the seal leg 16a prevents generation of excessive slippage between the edge surface 16b of the seal leg 16a and the receiving surface 14b caused by the pressure acting in the direction of the reference axis. In addition, part of the laser beam irradiated onto the receiving surface 14b of the lamp body 14 is reflected internally off the edge surface 16b of the seal leg 16a. This internally reflected light is directed to an outer side surface 14d of the inner ribs 14c so as to heat and melt the inner ribs 14c. As a result, the outer side surface 14d of the inner ribs 14c and the inner side surface 16c of the seal leg 16a constitute a second bonded surface. This enhances the bonding strength between the front lens 16 and the lamp body 14.

Particularly, since the angle of inclination with respect to the horizontal plane of the bonded surface is set to 45°, the pressure acting in the direction of the reference axis allows not only slippage to be easily generated between the edge surface 16b of the seal leg 16a and the receiving surface 14b, but also a sufficient increase in the bonding width of the bonded surface. Moreover, the provision of the inner ribs 14c causes the laser beam reflected internally off the edge surface 16b of the seal leg 16a to strike the outer side surface 14d of the inner ribs substantially in the vertical direction in an efficient manner. This enhances the bonding strength between the outer side surface 14d of the inner ribs 14c and the inner side surface 16c of the seal leg 16a.

Figure 4:
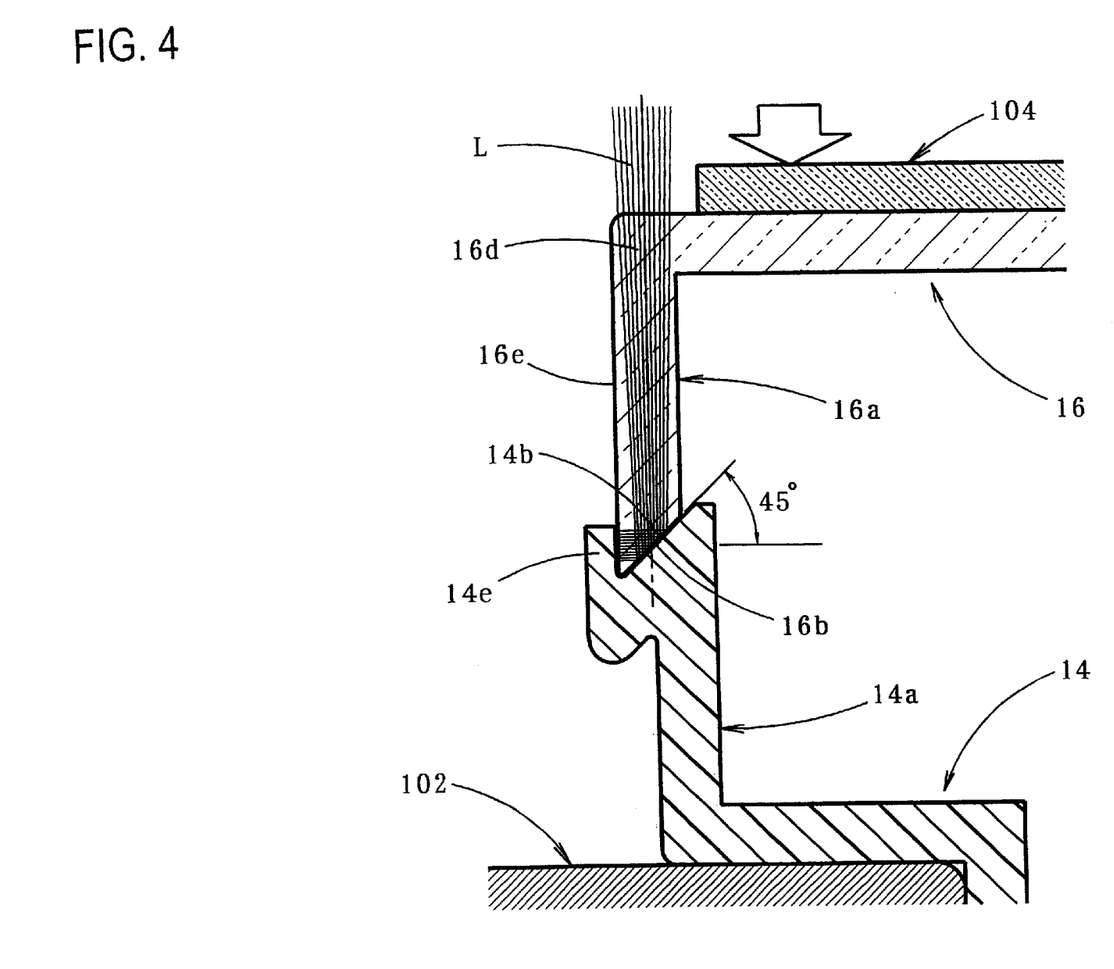
FIG. 4 is a view similar to FIG. 2 showing a first modified example of the preferred embodiment.

FIG. 4 is a view similar to FIG. 2 showing a first modified example of the embodiment.

In this modified example, similar to the previously described embodiment, the edge surface 16b of the seal leg 16a of the front lens 16 is inclined at an angle of 45° with respect to the horizontal plane, as shown in the drawing. In this example, however, the edge surface 16b is inclined toward the outer periphery. Further, the receiving surface 14b of the lamp body 14 is formed on the same side as the edge surface 16b of the seal leg 16a as a plane inclined at an angle of 45° with respect to the vertical direction. An additional outer rib 14e protruding in the direction of the reference axis along the outer side surface 16f of the seal leg 16a of the front lens 16 is formed on the receiving surface 14b of the lamp body 14.

The aforementioned structure provides the same operational effects as those obtained from the first-described embodiment.

Figure 5:
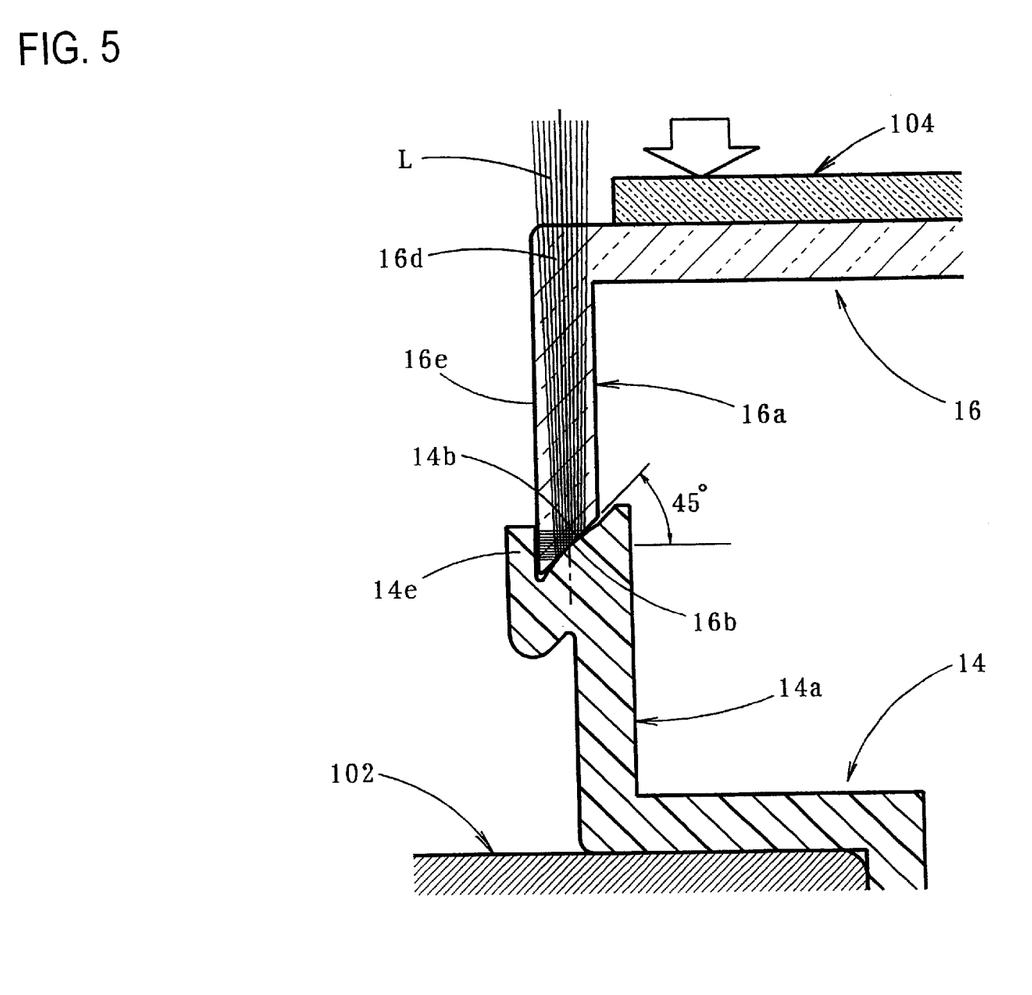
FIG. 5 is a view similar to FIG. 2 showing a second modified example of the preferred embodiment.

FIG. 5 is a view similar to FIG. 2 showing a second modified example of the preferred embodiment.

Referring to FIG. 5, the basic structure of the modified example is substantially the same as that of the aforementioned first modified example. In the second modified example, however, an approach having a concave, arc-like section is formed on the receiving surface 14b of the lamp body 14.

The receiving surface 14b is formed in a curved shape such that the irradiation energy of the laser beam L is converged by reducing the contact surface between the edge surface 16b of the seal leg 16a and the receiving surface 14b at an earlier stage of the bonding work. The contact portion is gradually expanded as the heating and melting of the receiving surface 14b proceeds. As a result, the efficiency of the bonding process is improved. The bonded surface is formed as an inclined surface, similar to the aforementioned embodiment, when the laser beam welding operation is completed.

The approach may be formed on the edge surface 16b of the seal leg 16a instead of the receiving surface 14b in the modified example. This provides the same effects as those of the previously described modified example.

Figure 6:
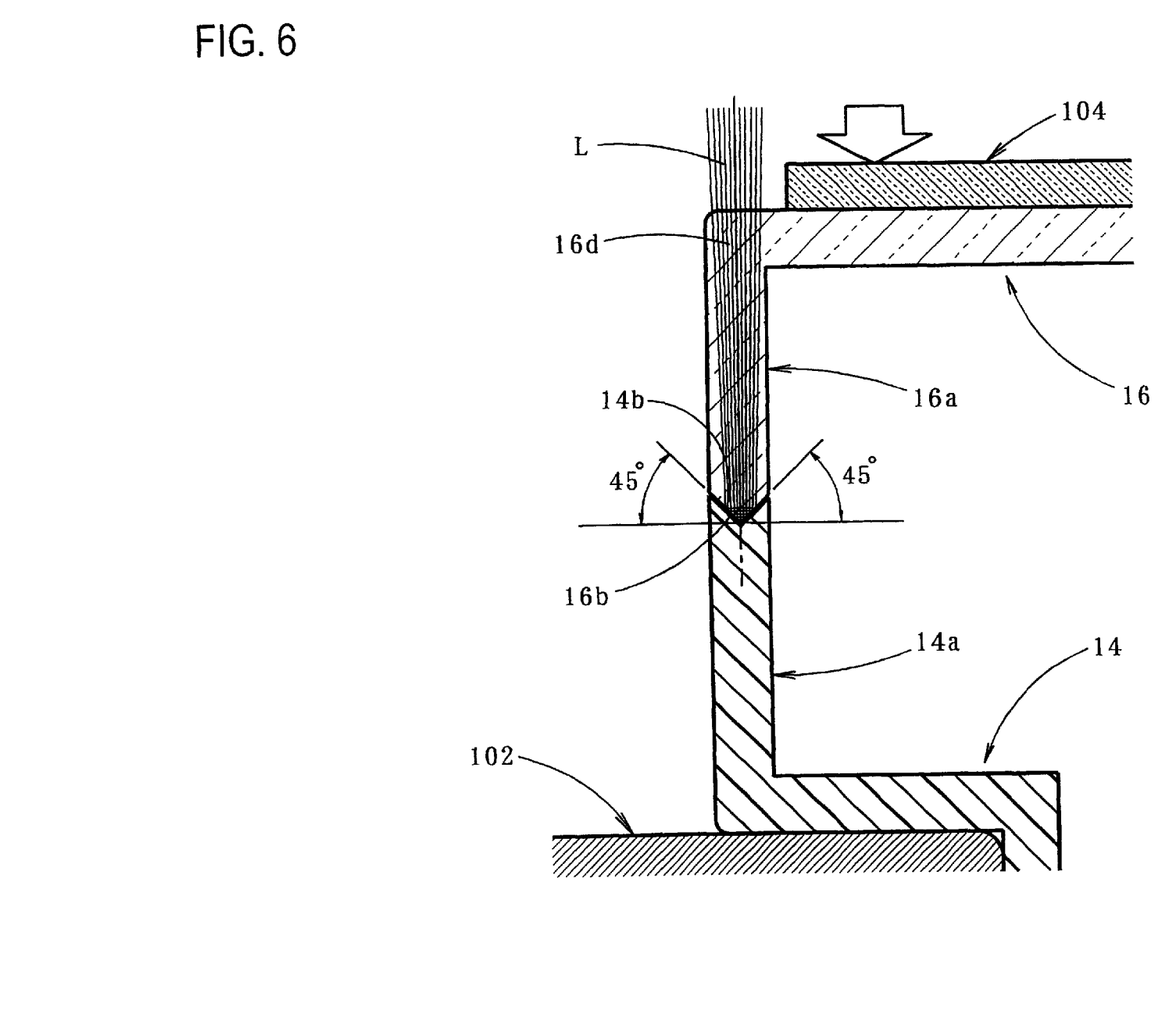
FIG. 6 is a view similar to FIG. 2 showing a third modified example of the preferred embodiment.

FIG. 6 is a view similar to FIG. 2 showing a third modified example of the preferred embodiment.

In this modified example, the bonded surface between the front lens 16 and the lamp body 14 is formed with a V-like shape, as shown in the drawing. In this modified example, the edge surface 16b of the seal leg 16a of the front lens 16 is formed as a triangular convex surface, two sides of which rise at 45° with respect to the horizontal plane. The receiving surface 14b of the lamp body 14 is formed as a triangular concave surface, the two sides of which rise at 45° with respect to the horizontal plane along the profile of the edge surface 16b.

With the bonded surfaces configured as described above, similar to the previously described embodiments, the beam spot diameter of the laser beam L irradiated onto the receiving surface 14b of the lamp body 14 can be increased by an amount corresponding to the angle of inclination. This makes it possible to increase the bonding width of the bonded surface so as to enhance the bonding strength.

Moreover, this modified example does not require the formation of inner or outer ribs on the receiving surface 14b of the lamp body 14. However, the same operational effects as those of the aforementioned embodiments can be obtained from the width space of the thickness both of the seal leg 16a of the front lens 16 and the peripheral edge flange portion 14a of the lamp body 14.

Various embodiments have been described with reference to the case where the vehicular lamp unit 10 is formed as an indicator lamp. However, similar effects to those of the aforementioned embodiments can be obtained by applying the teachings of the aforementioned embodiments to other kinds of vehicular lamp units.

What is claimed is:

1. A vehicular lamp unit comprising: a front lens and a lamp body, said front lens comprising a seal leg fromed along an outer periphery of said front lens, said lamp body comprising a receiving surface, an end surface of said seal leg abutting said receiving surface, said end surface of said seal leg and said receiving surface being directly bonded together by laser beam welding, wherein at least a portion of said end surface is chamfered.

2. The vehicular lamp unit according to claim 1, wherein said lamp body further comprises a plurality of ribs formed on said receiving surface, said ribs protruding in the direction of an optical axis of said lamp unit along a side surface of said seal leg.

3. the vehicular lamp unit according to claim 1, wherein said end surface is chamfered at an angle of inclination in a range from 40 to 50°.

4. The vehicular lamp unit according to claim 2, wherein said end surface is chamfered at an angle of inclination in a range from 40 to 50°.

5. The vehicular lamp unit according to claim 1, wherein at least a portion of said receiving surface is convexly curved.

6. The vehicular lamp unit according to claim 5, further comprising an outer rib protruding from said receiving surface in a direction of an optical axis along an outer side surface of said seal leg.

7. A vehicular lamp unit comprising: a front lens and a lamp body, said front lens comprising a seal leg formed along an outer periphery of said front lens, said lamp body comprising a receiving surface, an end surface of said seal leg abutting said receiving surface, said end surface of said seal leg and said receiving surface being directly bonded together by laser beam welding, and said bonded surface having a V-shape.

8. The vehicular lamp unit according to claim 7, wherein said end surface of said seal leg has the form of a convex V, and said receiving surface has the shape of a concave V.

9. A process for producing a vehicular lamp unit comprising the steps of:

providing a front lens having a seal leg on an outer periphery of the front lens having an end surface that is chamfered;

providing a lamp body having a receiving surface that is chamfered so as to correspond to said end surface of said seal leg of said lamp body;

abutting said end surface of said seal leg against said receiving surface; and irradiating a laser beam onto said receiving surface through said seal leg while pressing said front lens toward said lamp body in a bonding direction to thereby bond said front lens to said lamp body.

10. The process for producing a vehicular lamp unit according to claim 9, wherein said lamp body further comprises a plurality of ribs formed on said receiving surface, said ribs protruding in a direction of an optical axis of said lamp unit along a side surface of said seal leg.

11. The process for producing a vehicular lamp unit according to claim 9, wherein said end surface is chamfered at an angle of inclination in a range from 40 to 50°.

12. The process for producing a vehicular lamp unit according to claim 10, wherein said end surface is chamfered at an angle of inclination in a range from 40 to 50°.

13. A process for producing a vehicular lamp unit comprising the steps of:

providing a front lens having a seal leg on an outer periphery of the front lens having an edge surface formed with a convex V-shape;

providing a lamp body having a receiving surface having a concave V-shape at a position corresponding to said edge surface of said seal leg of said lamp body;

abutting said end surface of said seal leg against said receiving surface; and irradiating a laser beam onto said receiving surface through said seal leg while pressing said front lens toward said lamp body in the bonding direction to thereby bond said front lens to said lamp body.

14. A vehicular lamp unit comprising: a front lens and a lamp body, said front lens comprising a seal leg formed along an outer periphery of said front lens, said lamp body comprising a receiving surface, an end surface of said seal leg abutting said receiving surface, said end surface of said seal leg and said receiving surface being directly bonded together by laser beam welding, and said bonded surface being inclined at a predetermined angle with respect to a plane perpendicular to an optical axis of said lamp unit;

wherein at least a portion of said receiving surface is convexly curved.

15. A vehicular lamp unit comprising: a front lens and a lamp body, said front lens comprising a seal leg formed along an outer periphery of said front lens, said lamp body comprising a receiving surface, an end surface of said seal leg abutting said receiving surface, said end surface of said seal leg and said receiving surface being directly bonded together by laser beam welding, and said bonded surface being inclined at a predetermined angle with respect to a plane perpendicular to an optical axis of said lamp unit;

further comprising an outer rib protruding from said receiving surface in a direction of said optical axis along an outer side surface of said seal leg.

* * * * *